Aug. 17, 1965  S. ANGELINI  3,200,659
ROTARY MOTION TRANSMITTING MECHANISM FOR INTERNAL
COMBUSTION ENGINES AND THE LIKE
Filed April 24, 1963  2 Sheets-Sheet 1

INVENTOR.
Sergio Angelini
BY
Bernard, McGlynn & Reising
ATTORNEYS

Aug. 17, 1965    S. ANGELINI    3,200,659
ROTARY MOTION TRANSMITTING MECHANISM FOR INTERNAL
COMBUSTION ENGINES AND THE LIKE
Filed April 24, 1963    2 Sheets-Sheet 2

INVENTOR.
Sergio Angelini
BY
Barnard, McGlynn & Reising
ATTORNEYS

United States Patent Office 3,200,659
Patented Aug. 17, 1965

3,200,659
ROTARY MOTION TRANSMITTING MECHANISM FOR INTERNAL COMBUSTION ENGINES AND THE LIKE
Sergio Angelini, Fenton, Mich., assignor to John Dolza, Fenton, Mich.
Filed Apr. 24, 1963, Ser. No. 275,329
11 Claims. (Cl. 74—219)

This invention relates to an improved mechanism for transmitting rotary motion from one rotary member to another, laterally spaced rotary member. The invention has particular utility as the connection between the crankshaft and the camshaft in an internal combustion engine and will be described in detail with reference to this particular embodiment thereof; however, it will be understood that the improved mechanism can be used in many other devices, systems, and environments.

In all conventional reciprocating type internal combustion engines, the camshaft which imparts reciprocating motion in timed sequence to the intake and exhaust valves is driven by means of a gear on the camshaft connected by a chain to a gear on the crankshaft. It is, of course, very important that the chain connection between the gears be tight since any slack in the chain leads to torsional oscillation of the camshaft, timing variations and valve mechanism noises. If slack is excessive, whipping of the chain with associated gear tooth wear can result, along with the hazard that the chain will disengage from the gears. Because of the inevitable slight variations in chain and gear sizes and in gear spacing resulting from normal manufacturing tolerances, it is difficult if not impossible to accomplish the chain tautness required without incorporating some special means or mechanism for accomplishing it. This problem of maintaining a taut chain connection between the gears is further complicated by the fact that the crankshaft and the camshaft are mounted to a common support, to wit, the engine block, and as the engine temperature fluctuates, as from a cold engine to a hot engine, the lateral spacing between the shafts undergoes variation due to metal expansion and contraction. Hence, while the chain connection might be taut when the engine is hot, it would normally become slack when the engine is cool due to slight contraction of the engine block.

One obvious solution to the problem would be to use an elastic chain instead of one of fixed length such that its inherent elasticity would maintain it taut at all times. However, this is disadvantageous for the reason that an elastic chain inherently lacks various essential properties, most importantly tensile strength. The stock solution to the problem, which is in common use at the present time, is to use an idler gear or other tensioning device which biases against the chain to maintain it taut. This has two disadvantages. First, it increases the noise produced by the mechanism during engine operation, since with each additional gear-to-chain connection the noise level becomes greater. Secondly, it is expensive because it requires additional, relatively costly parts.

A fundamental objective of this invention is the provision of a mechanism for transmitting drive between a pair of rotary members mounted on generally parallel but laterally offset shafts wherein variations in the lateral distance between shafts may be accommodated without introducing torsional oscillations or variations between the rotary members. In other words, the present mechanism provides a rotary motion transmitting drive train in which there is substantially no torsional wrap-up or relative torsional movement between rotary members while permitting variations in the lateral displacement in the rotative axes of such members.

A further and specific object is the provision of an improved and simplified mechanism for transmitting rotary motion from the crankshaft to the camshaft so as to maintain proper valve timing even though the lateral distance between said shafts may vary. Still another object is the provision of an improved rotary member particularly useful in rotary motion transfer mechanisms in which lateral distances between coacting rotary axes are variable.

Briefly, these objects are accomplished by constructing one or both of the gears or other rotary members with a hub, a rim, and resilient means connecting the hub and rim such that an eccentric relationship can exist between the hub and the rim. Hence, an extremely strong non-elastic chain can be used and without need for a chain biasing idler gear mechanism. The resilient connection between the hub and rim maintains the chain taut at all times irrespective of slight variations in the spacing between the axes of rotation of the gears.

In copending United States patent application Serial No. 258,763 filed February 15, 1963, in the name of John Dolza, there is disclosed and claimed a rotary motion transmitting mechanism of the type described wherein the chain is maintained taut by constructing one of the gears with a hub and a rim and incorporating a resilient connection, specifically an elastomer material, between the hub and the rim whereby the hub can assume a position eccentric to the rim.

It is a more specific object of the present invention to provide an improved rotary motion transmitting mechanism of the type covered by the aforesaid patent application. More specifically, this invention has as one of its objects the provision of an improved mechanism of the type described wherein the resilient connection between the hub and the rim of one of the gears or other rotary member comprises a metal spring, the spring providing added assurance against any angular movement of the rim with respect to the hub while allowing excellent compression-tension radial resiliency to thereby permit the desired spring biased eccentricity between the hub and rim during rotation. Hence, the chain is maintained taut at all times by reason of the spring connection in the one gear and yet there is no tendency for the rim to move angularly with respect to the hub. The above and other objects, features, and advantages of the invention will appear more clearly from the following detailed description thereof made with reference to the appended drawings in which:

Figure 1:
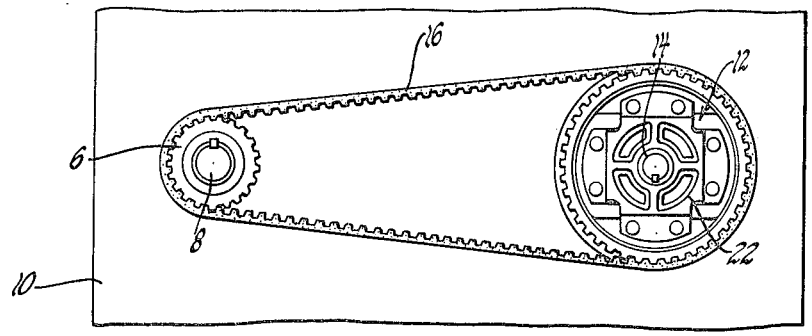
FIGURE 1 is a front view of a preferred embodiment of the invention showing a relatively small driving gear connected to the crankshaft of an engine, a large driven gear connected to the engine camshaft, and a toothed belt or chain connection between the two.

Referring now to FIGURE 1, the mechanism shown comprises a relatively small driving gear 6 secured to the end of crankshaft 8 which is rotatably supported by the metal engine block indicated at 10, a relatively large driven gear 12 secured to the end of the camshaft 14 which extends parallel to the crankshaft and which is also rotatably supported by the metal engine block 10, and a taut strong non-elastic continuous chain 16 engaging and interconnecting the driving and driven gears to transmit the rotary motion of the one to the other. Since the chain can be of substantially fixed length, requiring no elasticity, its construction should preferably be such as to provide optimum tensile strength. In the embodiment shown, the chain is formed of a cloth-organic polymer laminated material with the teeth molded therein and with imbedded continuous strands of metal wire or glass fiber to impart the high tensile strength. Such a chain has the advantage of being relatively noiseless as compared to a metal link chain.

In accordance with the invention, the driven gear 12 comprises a hub 18 which is keyed to the camshaft 14 and a rim 20 which has its outer periphery formed with gear teeth in engagement with the chain 16 and which is secured to the hub by a metal spring element 22. The spring element comprises a sheet of spring steel which is formed with a rectangular shaped center portion 24, the plane of which is parallel to that of the gear, and four equally spaced generally radially projecting laminar spring legs 26, 28, 30 and 32. Each leg is bent at substantially a right angle to the plane of the rectangular portion and hence has a flat portion 33 which extends in a plane at an angle, substantially normal, to the radial axis of the leg and which terminates with a radially outwardly bent flange 34. The center portion of the spring element is formed with four arcuate shaped stamped reinforcing ribs 36 arranged in an annulus around a center opening 38, and each leg is narrowed as indicated at 40 to provide improved flexibility characteristics.

Figure 6:
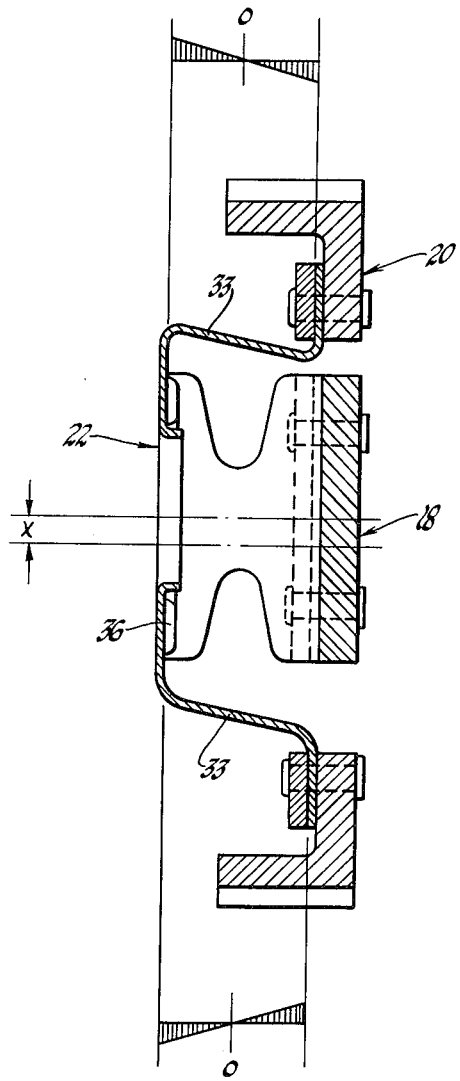
FIGURE 6 is a diagrammatic representation of the spring element in a pre-loaded condition and connecting the hub and rim of the driven gear.

To better understand the construction of spring element 22, reference is now made to FIGURE 6 which diagrammatically depicts the connection of the element to hub 18 and rim 20. In FIGURE 6 spring 22 is shown in a distended condition as occurs when hub 18 and rim 20 are eccentrically disposed.

The bending moment diagrams at the top and bottom of FIGURE 6 are applicable to the leg portions 33 adjacent thereto. Since the ends of leg portions 33 are fixed against rotation in response to the force and turning couples exerted on the legs due to relative radial displacement of hub and rim, the bending moment diagrams are as shown. Further, the reaction forces cause the bending moments to change from positive to negative along the length of leg portions 33 resulting in a zero bending moment at mid-point. Because the bending moment is zero at the mid-point of leg portions 33, a tapering of said portions toward the center can be utilized to provide a narrow waist portion $w$. In this way a lower spring rate and better stress distribution can be secured than is possible with a uniform leg width.

The hub 18 is keyed to camshaft 14 which includes two radially outwardly extending diametrically opposed flanges, 42 and 43. The rim comprises an outer gear-toothed cylindrical portion having a pair of diametrically opposed inwardly extending arcuate flanges 44 and 45, these flanges being oriented at 90° to and lying in the plane of the flanges 42 and 43 on the hub. A flat metal ring 48 having an external diameter somewhat greater than that of the gear toothed portion is welded concentrically to the latter and hence provides an outwardly extending annular flange on one side of the rim to assist in maintaining the chain 16 on the rim.

Figure 2:
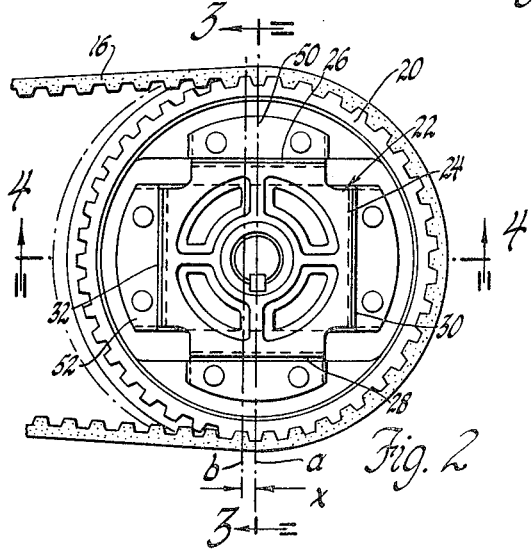
FIGURE 2 is an enlarged view of the driven gear in the FIGURE 1 embodiment.
Figure 3:
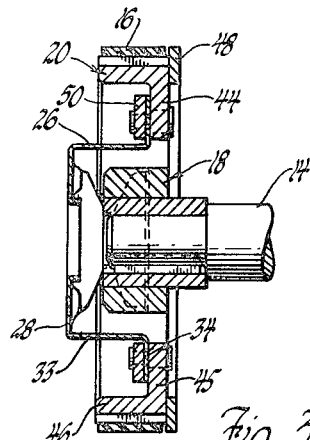
FIGURE 3 is a sectional view of the driven gear taken on the line 3—3 of FIGURE 2.
Figure 4:
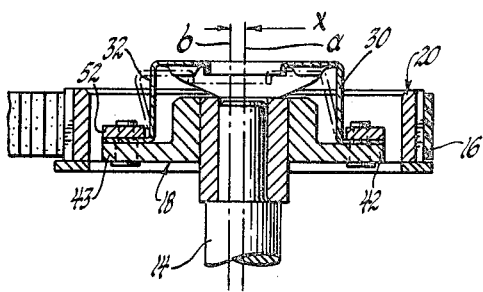
FIGURE 4 is a sectional view of the driven gear taken on the line 4—4 of FIGURE 2.
Figure 5:
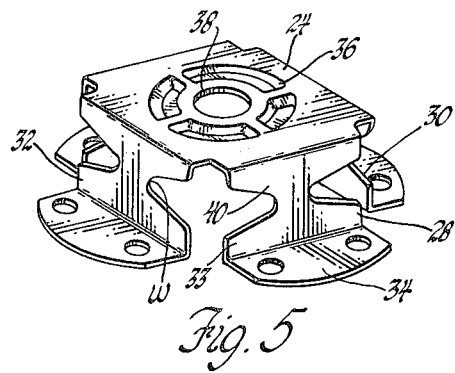
FIGURE 5 is a perspective view of the spring element incorporated in the FIGURES 1-4 embodiment.

The two spring legs 26 and 28 are secured to the rim flanges 44 and 45 respectively by means of rivets, as shown, which extend through aligned openings in the rim flanges and in the flanges at the ends of the legs. To provide a more firm attachment, a metal shoe 50 is interposed between the rivet heads and each of the spring leg flanges. Similarly, spring legs 30 and 32 which alternate legs 26 and 28 are secured to the radially outwardly extending flanges 42 and 43, respectively, on the hub by rivets, metal shoes 52 also being used here to provide a stronger attachment. As indicated by the broken lines in FIGURE 4, the rim can therefore shift from a concentric to an eccentric position with respect to the hub by reason of the flexing of the laminar spring legs. When the angular orientation of the gear is as shown in FIGURE 2, any eccentricity demanded in maintaining the chain taut is by way of the flexing of legs 30 and 32, and when the gear rotates 90° from the position shown in FIGURE 2, any eccentricity is by way of the flexing of legs 26 and 28. When the gear is in an angular position intermediate these two, all four spring legs flex slightly to provide the eccentricity. It will be noted however that whereas the spring legs allow for spring biased eccentricity between the hub and the rim, there can be no angular movement of the hub with respect to the rim in the plane of the gear, and hence no wind-up of the hub with respect to the rim; neither can there be any substantial angular movement of the rim out of the plane of the hub.

In operation, the chain is assembled to the gears tautly when the engine is cold and hence has no slack prior to or during engine warm-up, the spring connection between the hub and the rim of the one gear assuring chain tautness irrespective of minor variations in parts sizes and spacing due to manufacturing tolerances.

As assembled, the rotative axis $a$ of hub 18 is offset from the rotative axis $b$ of rim 20 an initial amount $x$. The minimum $x$ determined by pretensioning the chain to at least the maximum tangential pulsating force introduced into the chain by engine operation or to the tension required to produce the minimum desired belt vibration frequency. For instance, and with a particular engine, fifty pounds of pre-load between members 6 and 12 will equal or exceed slightly the maximum tangential force required to overcome the peak torque reaction of the cam on the camshaft 14. Unless such pretensioning of member 12 is undertaken, the pulsating tangential force which is variously introduced into chain 16, would start member 12 "bouncing."

The axis offset $x$ of rim 20 is in the opposite direction of thermal expansion as block 10 becomes heated. In other words, as the engine heats, camshaft 14 moves away from crankshaft 8 and the distance $x$ will become larger increasing the eccentricity. At the same time, due to the essential non-elasticity of belt or chain 16, rim 20 will remain in its same spatial relationship with respect to drive gear 6. This initial and controlled eccentricity insures that the direction of eccentricity is always the same even though the magnitude may vary. This relationship further enhances stability of the drive system including its ability to transmit drive between members 6 and 12 without torsional oscillations.

It will be understood that while the invention has been described in detail specifically with reference to a preferred embodiment thereof various changes and modifications may be made all within the full and intended scope of the claims which follow.

I claim:

1. A rotary motion transmitting mechanism comprising a first rotary member, a second rotary member with its axis of rotation spaced from that of the first rotary member, and means interconnecting said rotary members to transmit the rotary motion of the one to the other, at least one of said rotary member having a hub, a rim, and a plurality of generally radially projecting thin plate spring portions connecting the hub to the rim, each of said spring portions having a part which extends in a plane at an angle to the radial axis of the leg to thereby permit eccentricity between the hub and the rim while inhibiting angular movement of the hub with respect to the rim.

2. A rotary motion transmitting mechanism comprising a first rotary member, a second rotary member with its axis of rotation spaced from that of the first rotary member, and means interconnecting said rotary members to transmit the rotary motion of the one to the other at least one of said rotary members having a hub, a rim, and a metal spring with a center portion and a plurality of generally radial legs projecting from the center portion each leg having a substantially flat portion intermediate the free end thereof and said center portion and extending in a plane which is at an angle to the radial axis of the leg, the free ends of said legs being alternately secured to said hub and said rim to thereby permit spring biased eccentricity between the hub and the rim while inhibiting angular movement of the hub with respect to the rim.

3. A rotary motion transmitting mechanism as set forth in claim 2 wherein said spring has four legs each leg being at 90° to the next adjacent legs.

4. A rotary motion transmitting mechanism as set forth in claim 2 wherein the substantially flat portion of each spring leg is about normal to the radial axis of the leg.

5. A rotary motion transmitting mechanism comprising a first rotary member, a second rotary member with its axis of rotation spaced from that of the first rotary member, and means interconnecting said rotary members to transmit the rotary motion of the one to the other at least one of said rotary members having a hub with a pair of diametrically opposed radially outwardly extending flanges, a rim with a pair of diametrically opposed radially inwardly extending flanges, and a spring formed of flat sheet metal having a center portion and four equally spaced legs projecting generally radially outwardly from the center portion, each leg having a portion extending in a plane at an angle to the radial axis of the leg, the free ends of said legs being alternately secured to the flanges on said hub and the flanges on said rim to thereby permit eccentricity between the hub and the rim while inhibiting angular movement of the hub with respect to the rim.

6. A rotary motion transmitting mechanism as set forth in claim 5 wherein the means interconnecting said rotary members is a closed flexible loop of substantially fixed length.

7. A rotary motion transmitting mechanism comprising a first rotary member connected to a shaft, a second rotary member connected to a second shaft parallel to and spaced from said first mentioned shafts, both of said shafts being rotatably supported by a common support which is subject to expansion due to temperature fluctuations, and means interconnecting said rotary members to transmit the rotary motion of the one to the other, said means preventing any increase in the spacing between the outer peripheries of said rotating members, at least one of said rotary members having a hub, a rim, and a plurality of generally radially projecting metal spring legs connecting the hub to the rim each of said spring legs having a portion intermediate the ends thereof which extends in a plane which is at an angle to the radial axis of the leg to thereby permit eccentricity between the hub and the rim and allow for variation in the spacing between the shafts due to expansion of the support.

8. A motion transmitting device comprising a first rotatable shaft, a second rotatable shaft laterally offset from said first shaft and generally parallel thereto, a pair of pulley members respectively fixed for rotation with said first and second shafts, and a continuous belt of substantially fixed length interconnecting said pulleys to transmit rotary motion between said shafts, at least one of said pulleys having a hub fixed to the associated shaft, a rim, and a laminar metal spring connection between the hub and rim to permit eccentricity between the hub and the rim to allow for any variation in the spacing between the shafts without substantially varying the force on said belt during rotation of said pulleys, said belt length being such as to pretension said spring and impart an initial eccentricity to said rim relative to said hub.

9. An internal combustion engine having a crankshaft, a camshaft spaced from and generally parallel to the crankshaft, a gear connected to the crankshaft, a gear connected to the camshaft and a continuous chain of substantially fixed length interconnecting said gears to transmit the rotary motion of the one to the other, at least one of said gears having a hub, a rim, and a metal spring connection between the hub and the rim including a plurality of generally radially projecting spring legs each having a substantially flat portion extending in a plane generally normal to the leg's radial axis to permit eccentricity between the hub and the rim and thereby allow for any variation in the spacing between the drive shaft and the camshaft.

10. A rotary member comprising a hub, a rim, and a metal spring member connecting the hub to the rim, said spring member having a center portion and a plurality of generally radially projecting spring legs, each having a portion extending in a plane at an angle to the radial axis of the leg and having a central portion of reduced width to reduce the spring rate resisting eccentric movement of the hub relative to the rim, the ends of said legs being alternately secured to said hub and said rim to thereby permit the hub to assume an eccentric position with respect to the rim while inhibiting any angular movement of the hub with respect to the rim.

11. A rotary member as set forth in claim 10 in which said spring leg portions are planar members of substantially greater width than thickness, the width of each leg portion tapering toward the center to provide a center section of greatly reduced width relative to the ends of the leg portion.

References Cited by the Examiner

UNITED STATES PATENTS

| 650,264 | 5/00 | Moss | 74—230.4 |
| 1,967,052 | 7/34 | Dumm. | |
| 2,475,010 | 7/49 | Chilton. | |
| 2,615,316 | 10/52 | Kirwin | 74—230.01 X |

FOREIGN PATENTS

| 907,481 | 3/54 | Germany. |
| 117,574 | 11/46 | Sweden. |

DON A. WAITE, *Primary Examiner.*